W. F. MacGREGOR.
CORN HUSKING AND SHREDDING MACHINE.
APPLICATION FILED OCT. 30, 1905.

1,207,189.

Patented Dec. 5, 1916.
9 SHEETS—SHEET 1.

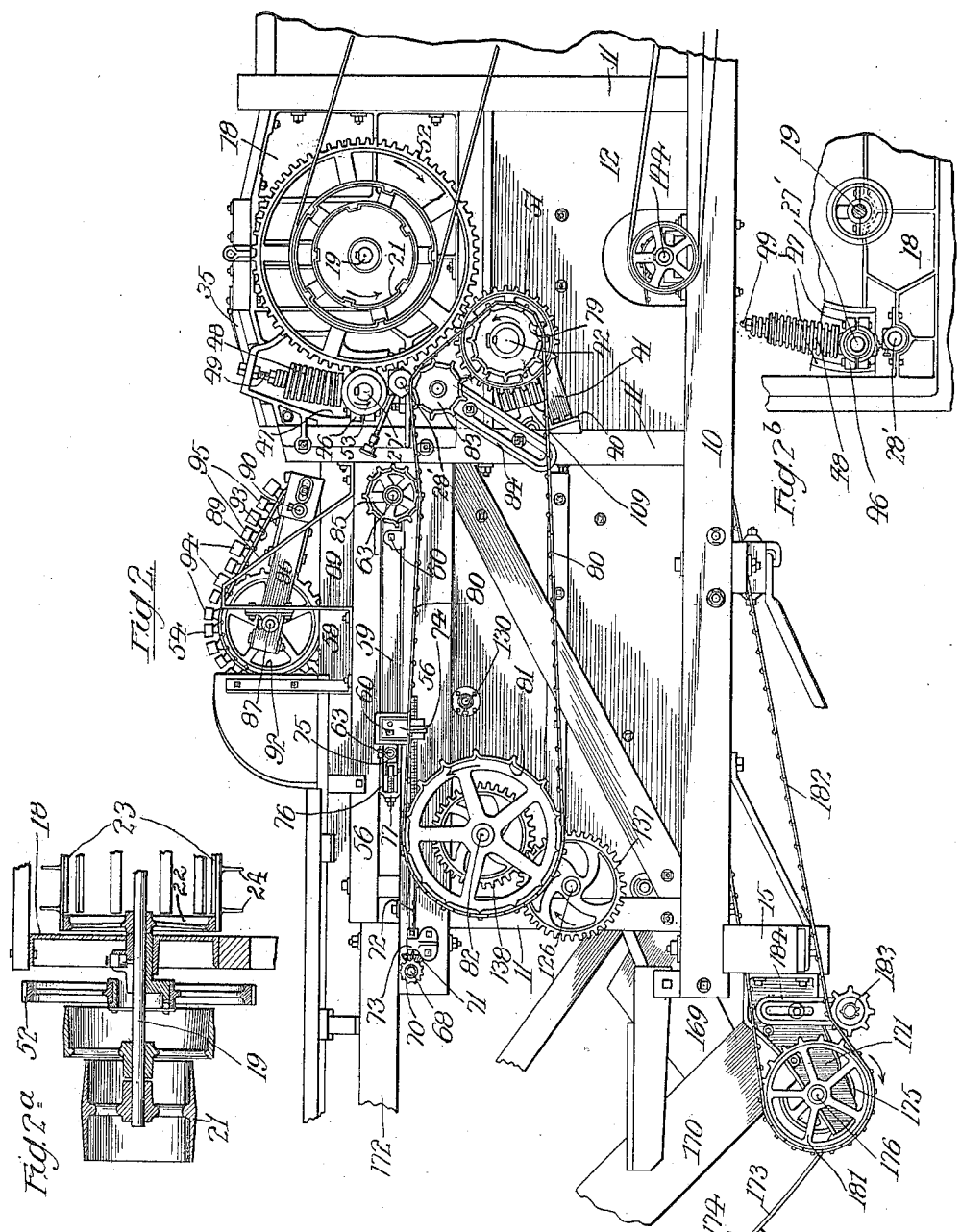

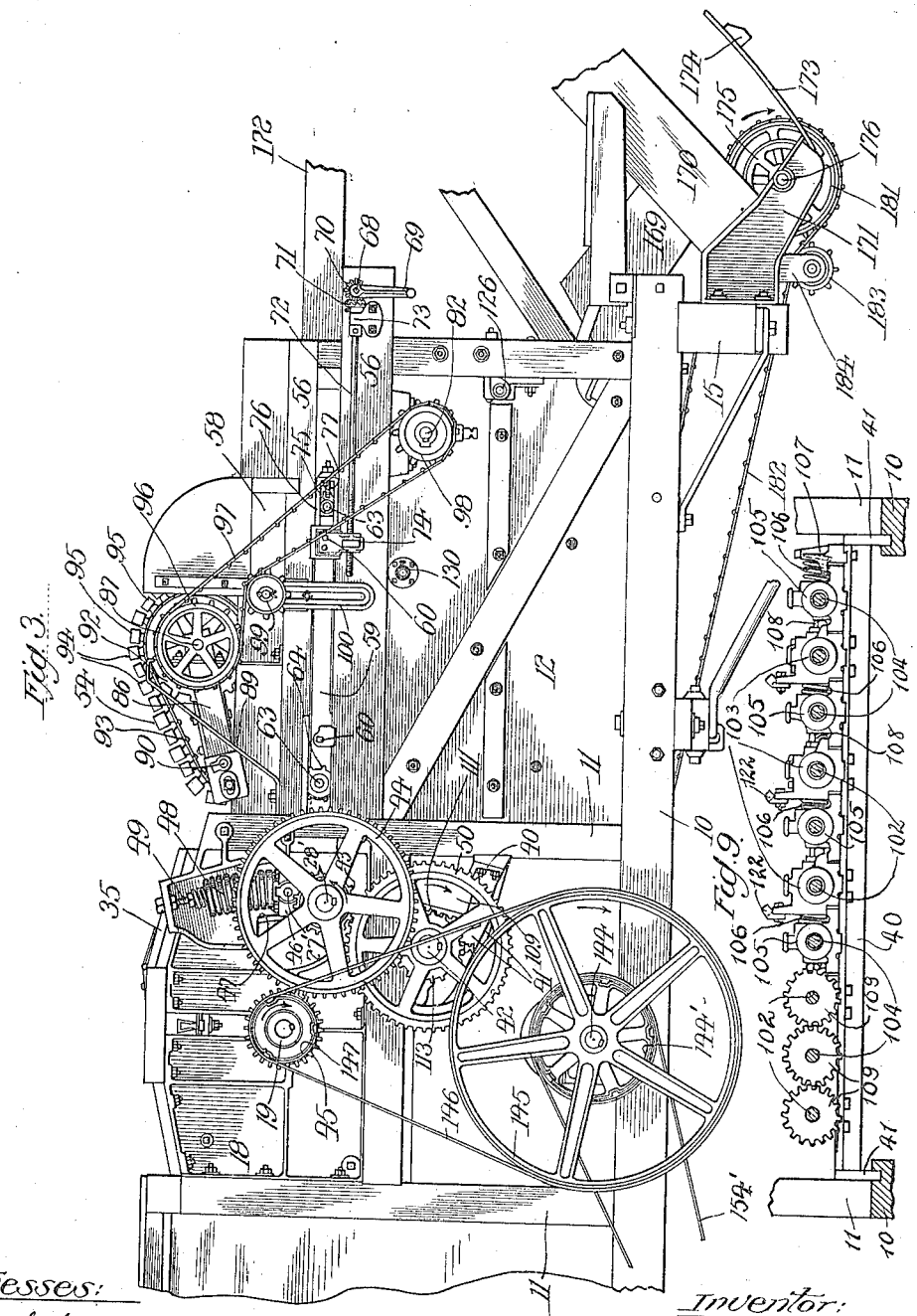

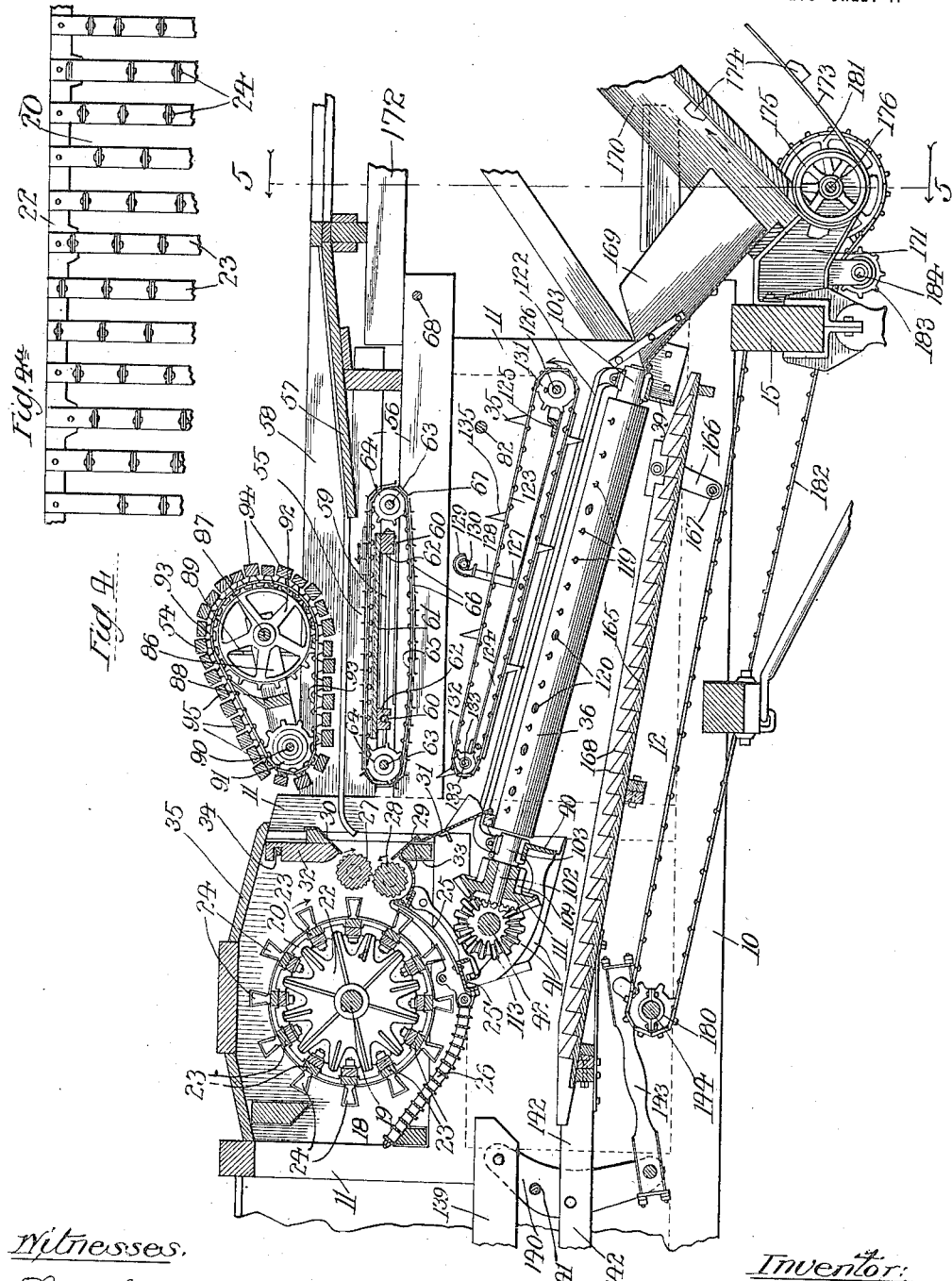

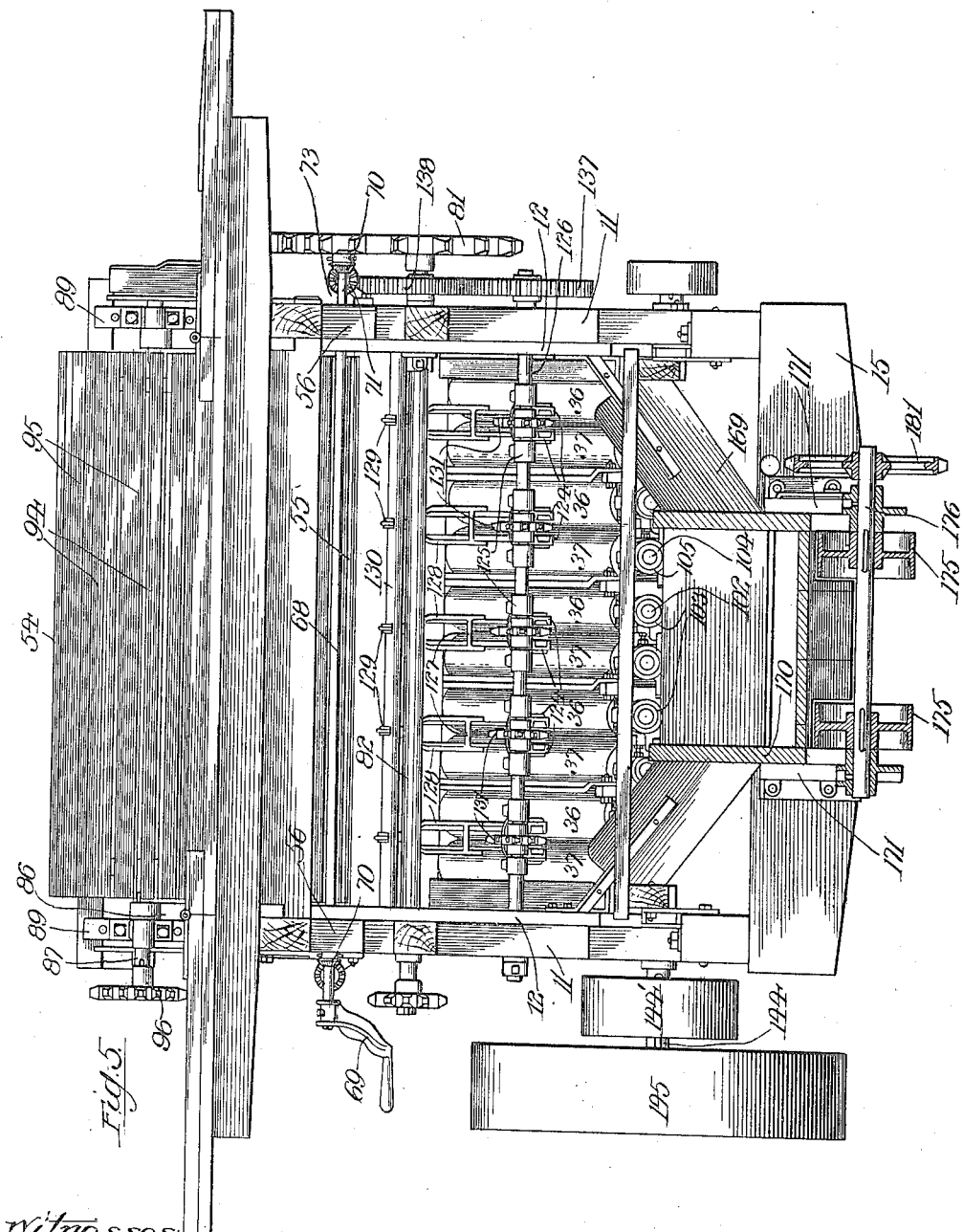

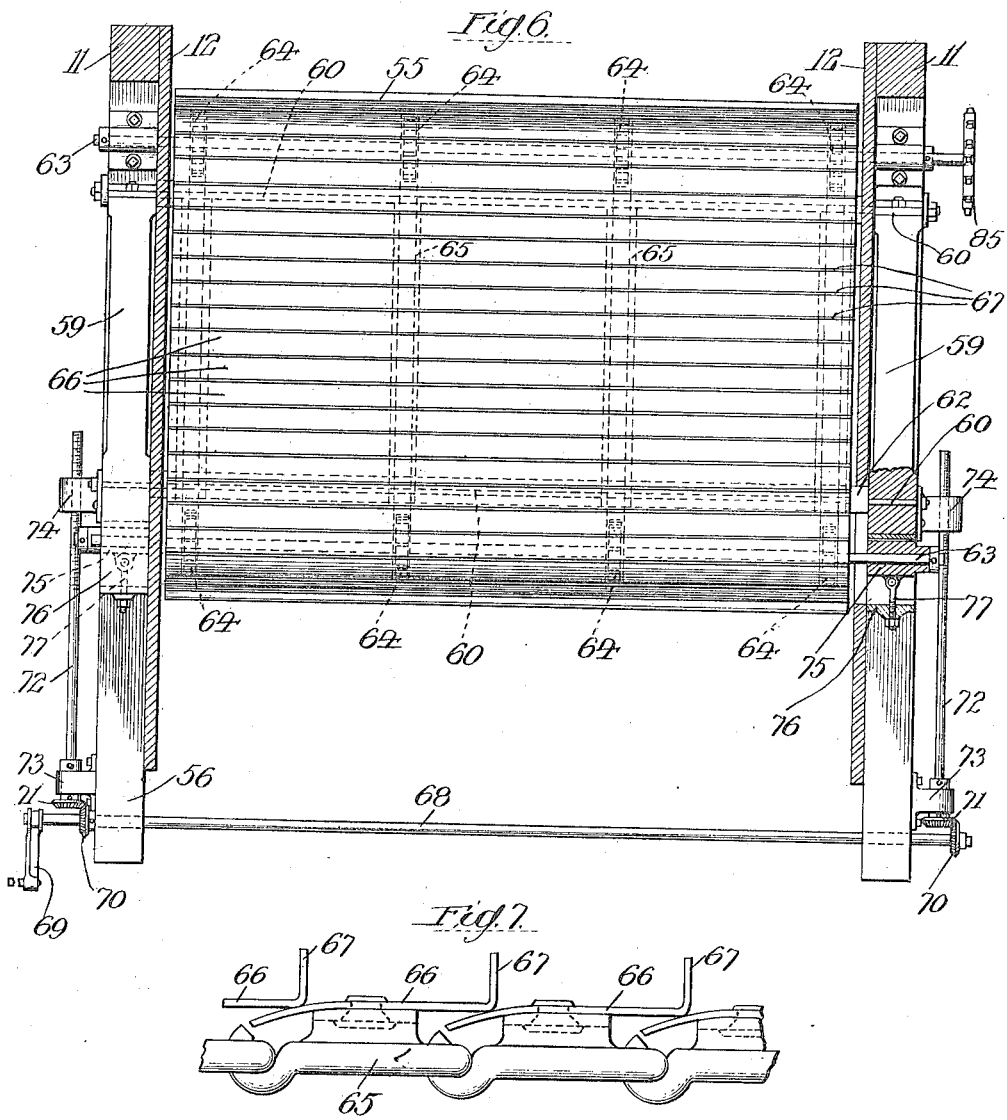

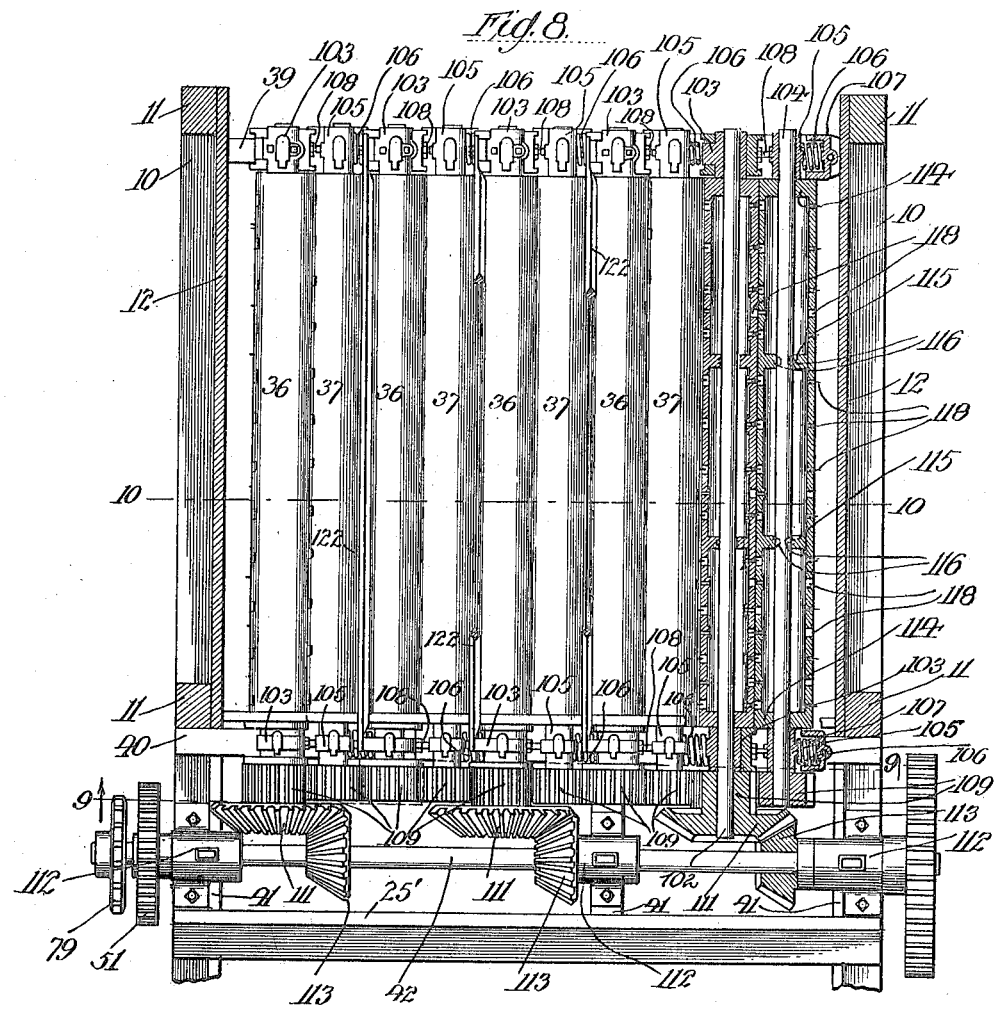

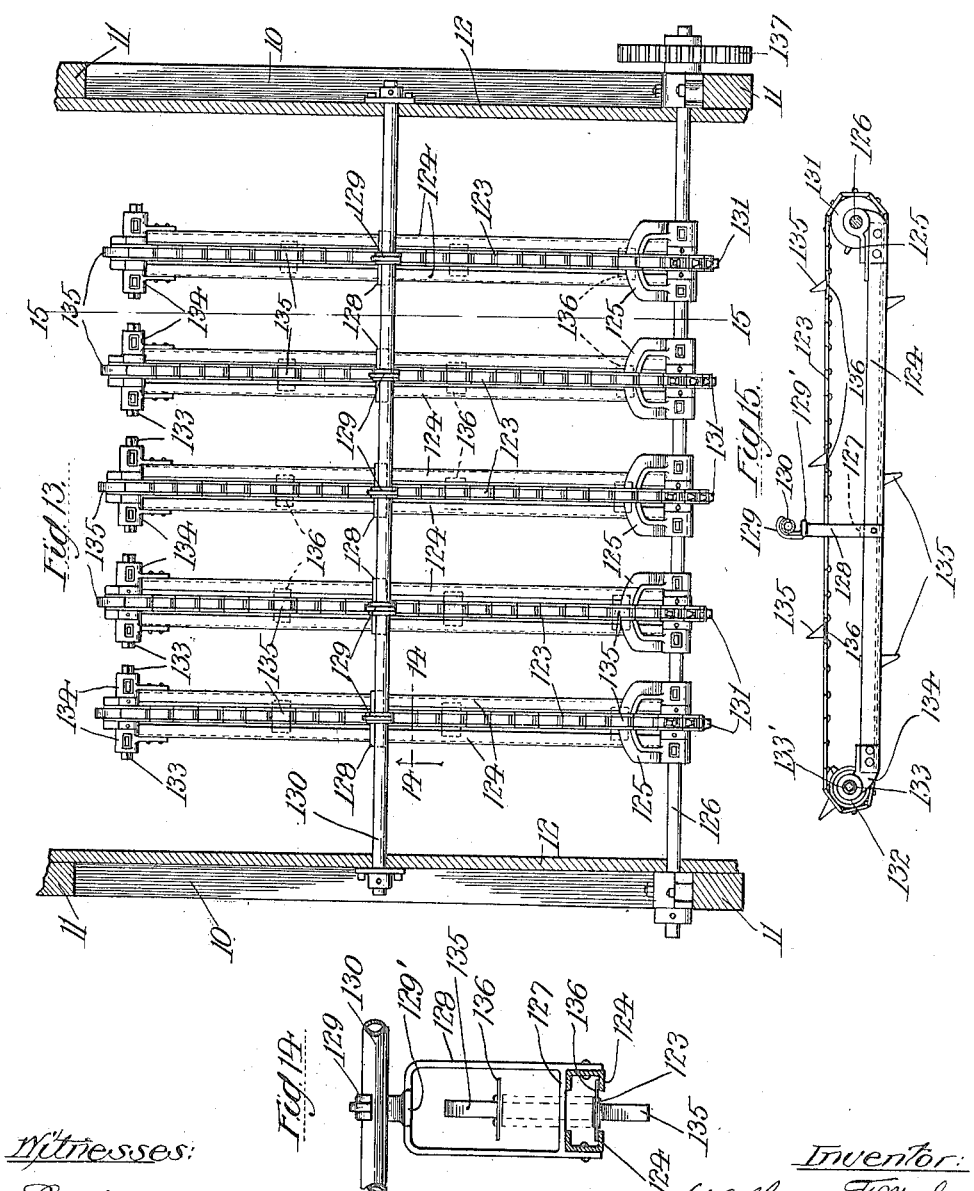

W. F. MacGREGOR.
CORN HUSKING AND SHREDDING MACHINE.
APPLICATION FILED OCT. 30, 1905.

1,207,189.

Patented Dec. 5, 1916.
9 SHEETS—SHEET 9.

UNITED STATES PATENT OFFICE.

WALLACE F. MacGREGOR, OF RACINE, WISCONSIN, ASSIGNOR TO J. I. CASE THRESHING MACHINE COMPANY, OF RACINE, WISCONSIN, A CORPORATION.

CORN HUSKING AND SHREDDING MACHINE.

1,207,189.   Specification of Letters Patent.   Patented Dec. 5, 1916.

Application filed October 30, 1905. Serial No. 285,202.

*To all whom it may concern:*

Be it known that I, WALLACE F. MAC-GREGOR, a citizen of the United States, and a resident of Racine, county of Racine, and State of Wisconsin, have invented certain new and useful Improvements in Corn Husking and Shredding Machines, of which the following is declared to be a full, clear, and exact description.

The invention relates to machines for separating and husking the ears of corn and for shredding the stalks, and seeks to provide an improved construction which will withstand the severe strains to which such machines are subjected.

The invention also seeks to improve and simplify the drive mechanism for the snapping and husking rolls by reducing the number of necessary gears and which mechanism is so arranged that the movement of the yielding snapping roll cannot throw it out of mesh.

Further objects of the invention are to improve the construction of husking rolls, assisters therefor, and the drive mechanism for these parts; to provide an improved construction for the shredding cylinder and separating fan and to provide means whereby all the trash and husks, including those from the husking rolls, will be carried to the sieves for the separation therefor of any corn shelled by the operation of the parts of the machine.

With these and other objects in view, the invention consists in the features of construction, combinations and arrangements of parts hereinafter set forth, illustrated in the accompanying drawings and more particularly pointed out in the appended claims.

Figure 16:
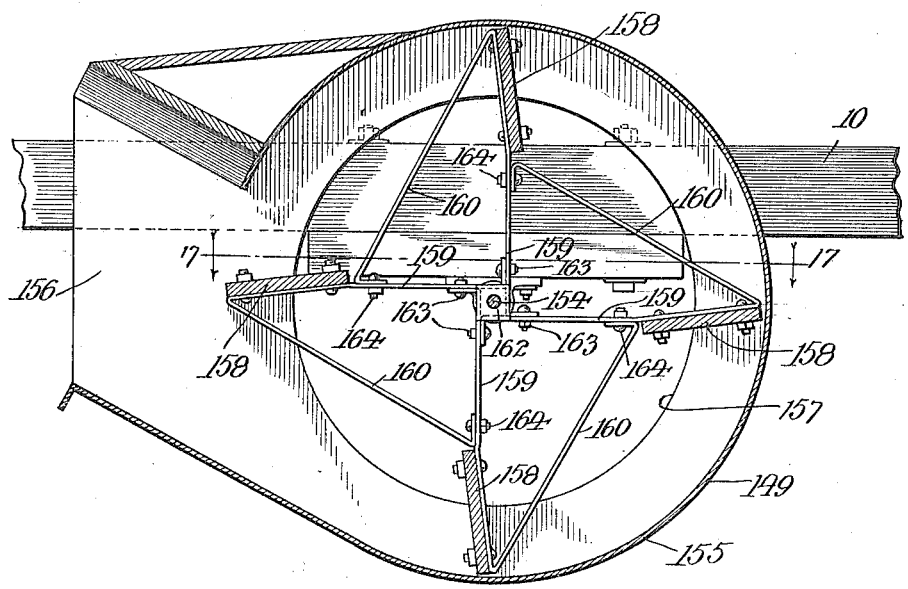
Figure 17:
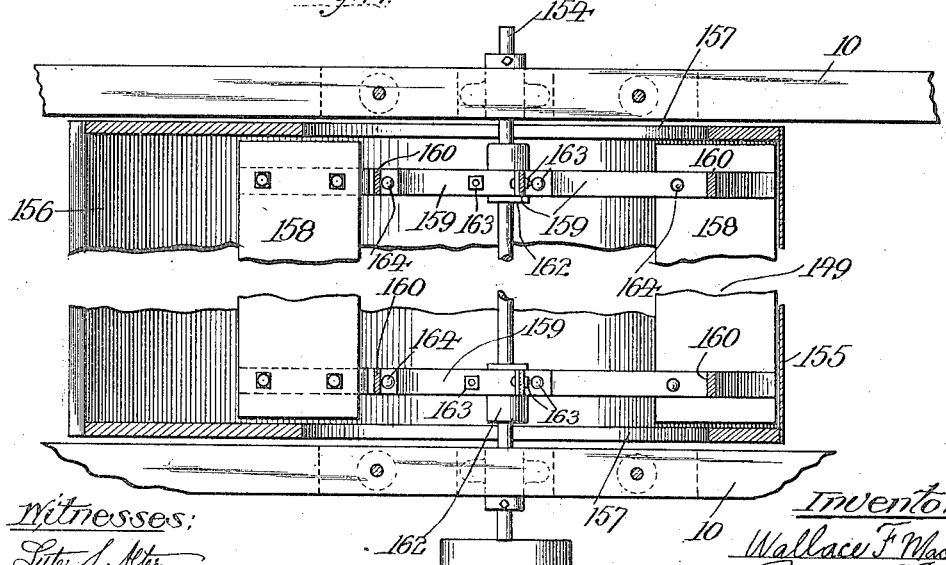

In the drawings, Figure 1 is a longitudinal section through the improved husking and shredding machine. Fig. 2 is a partial elevation of one side of the same showing the driving mechanism. Figs. 2ª and 2ᵇ are detail views of parts shown in Fig. 2. Fig. 3 is a view similar to Fig. 2 showing a part elevation of the opposite part of the machine. Fig. 4 is an enlarged longitudinal section through the main operating parts of the machine. Fig. 4ª is a development of a portion of the shredding cylinder. Fig. 5 is a front view with certain parts shown in section on the line 5—5 of Fig. 4. Fig. 6 is a plan view of the lower adjustable feed rake or apron with certain parts shown in section. Fig. 7 is a detail edge view of the lower feed apron showing its construction. Fig. 8 is a plan view of the husking rolls with certain parts shown in section. Figs. 9 and 10 are sectional views on the lines 9—9 and 10—10 respectively of Fig. 8. Fig. 11 is an enlarged sectional view of one of the husking rolls. Fig. 12 is a detail view of one of the pins for the husking rolls. Fig. 13 is a plan view of the assisting or feeding devices that coöperate with the husking rolls. Figs. 14 and 15 are detail sections on lines 14—14 and 15—15 respectively of Fig. 13. Fig. 16 is a longitudinal section through the separating fan. Fig. 17 is a sectional view thereof on line 17—17 of Fig. 16.

The frame of the machine comprises the main longitudinal side sills 10, posts 11 rising from the sills, inclosing side walls 12 and deck 13. At its rear end, the frame is supported from the rear wheel axle 14. The forward ends of the side sills 10 rest upon a cross bolster 15 that is swiveled to the front steering axle 16, to which the draft pole 17 is connected. Between adjacent uprights near the center of the machine, and on opposite sides, are mounted heavy metal frame plates 18 (see Figs. 2 and 3), in which are journaled the cross shaft 19 that carries the shredding cylinder 20 (see Fig. 4). One end of the shaft 19 carries a drive pulley 21 (see Fig. 2) which may belted to an engine or other suitable source of power. The shredding cylinder (see Figs. 4 and 4ª) comprises end plates or heads 22 keyed to the shaft 19 and connected by a circular series of cross bars 23 carrying the knives 24. A curved plate 25 is arranged beneath the forward portion of the shredding cylinder and the inclined grate 26 extends rearwardly and upwardly from the rear edge of the plate 25 and beneath the rear portion of the shredding cylinder. The rear edge of the grate 26 and the forward edge of the plate 25 are connected to a heavy cross channel bar 25'.

The ears of corn are broken from the stalks as the latter are passed to the shredding cylinder, by a pair of fluted snapping rolls 27 and 28 arranged in front of the cylinder and above a curved plate 29. The stalks are directed to the snapping rolls by a pair of oppositely inclined deflecting plates 30 and 31, arranged in front of the rolls upon cross pieces 32 and 33. Cross piece 32 is preferably removably mounted upon a cross rod 34 and the roof or deck portion 35 above the shredding cylinder, is also preferably removable or hinged in order to afford access to the cylinder.

The ears broken off by the snapping rolls slide down the deflector plate 31 onto the husking bed that is comprised of a series of forwardly inclined rolls 36 and 37 (see Figs. 5 and 8). The journal boxes for the rolls (see Fig. 4) are mounted upon front and rear cross bars 39 and 40. The rear cross bar 40 is connected to the cross channel bar 25' by brace bars 41 upon which is journaled a transverse shaft 42 for driving the husking rolls.

Snapping rolls 27 and 28 are provided with reduced end portions or journals 27' and 28'. The lower snapping roll is held against lateral movement and to one end thereof is fixed (see Fig. 3) a small gear 43 and a large gear 44. The lower roll is driven by a small gear 45 on the end of the cylinder shaft 19 that meshes with the large gear 44 fixed to the roll. The upper snapping roll 27 is journaled in boxes 46 that are vertically movable in curved guide-ways 47 (see Figs. 2b and 3) and the roll is yieldingly held in position by heavy coiled springs 48 engaging the boxes 46 and having adjusting screws 49 for regulating their pressure. The upper snapping roll will thus yield to permit the passage of bunches of corn stalks of varying thicknesses between the rolls, but the upper roll will be at all times held sufficiently close to the lower roll to break off all the ears of corn.

The drive shaft 42 for the husking rolls is driven by the small gear 43 on the lower snapping roll which meshes with a larger gear 50 (see Fig. 3) on one end of the shaft. The opposite end of the shaft 42 is provided with a spur gear 51 that meshes with a large intermediate gear 52 loosely mounted upon one of the boxes of the cylinder shaft 19. Gear 52 meshes with a small shrouded gear 53 fixed to the end of the upper snapping roll 27, so that the latter is driven from the drive shaft for the husking rolls through the medium of the large gear 52. The power is thus transmitted from one end of the lower snapping roll, across the machine to the opposite end of the other snapping roll, through the medium of the drive shaft 42 for the husking rolls. This arrangement reduces the number of gears necessary and avoids the necessity of employing a transverse shaft. Moreover, by employing the large gear 52, which is concentric with the curved guides 47 and the center of which is substantially in the same horizontal plane as the center of the upper snapping roll when the latter is in normal position, will permit the up and down movement of the snapping roll 27 and the pinion thereon (the extent of which movement is considerable in a machine of this sort) without interfering with the proper mesh of the gears 52 and 53. The upper snapping roll may thus shift up and down in a direction substantially tangent to the large gear 52, but will be properly driven in all positions.

Corn is delivered to the snapping rolls by the upper and lower, endless feed rakes or aprons 54 and 55. The lower feed apron 55 travels between the longitudinal side bars 56 and the stalks are delivered onto the forward end thereof from an inclined feed table 57 arranged between the forward ends of a pair of side-boards 58. The lower feed apron is preferably adjustable to and from the snapping rolls 27 and 28, and for this purpose is carried on a sliding frame (see Figs. 2, 3, 4 and 6) comprising the side bars 59 connected by cross bolts 60. Supporting strips 61 are secured to a pair of cross bars 62 set over the bolts 60. Bars 62 also serve to hold the side pieces 59 apart. The side bars 56 of the machine frame, are spaced apart as shown in Figs. 2, 3 and 4, to form guide-ways for the side pieces 59, which extend between them. The frame of the lower feed apron is thus supported by the side bars 56 in horizontal position, but may be bodily adjusted in longitudinal direction to and from the snapping rolls 27 and 28.

Shafts 63 journaled in the ends of the side pieces 59, carry a series of sprockets 64 and sprocket chains 65 passing over the wheels 64 carry the cross slats 66 of the feed apron or rake. Cross slats 66 are preferably formed of sheet metal and are suitably riveted to the links of the chains 65, as shown in Fig. 7. The rear edges of the metal cross slats are bent to form upwardly projecting cross ribs 67 that present a good gripping surface to the stalks, and also serve to stiffen the cross slats. The forward edge of each cross slat is bent downwardly so that it may be overlapped to a considerable extent by the rear edge of the next adjacent slat (see Fig. 7). In this manner the lower feed apron presents a continuous surface upon which the stalks are fed to the snapping rolls.

A cross shaft 68 (see Figs. 2, 3 and 6) journaled in the forward ends of the lower side bars 56, is provided on one end with a crank handle 69 and on each end with beveled pinions 70 meshing with beveled pinions 71 on longitudinally extending screw shafts 72. Screw shafts 72 are journaled at their forward ends in brackets 73 and at their rear ends are threaded through brackets or lugs 74 fixed to and depending from the side bars 59 of the feeder frame.

It is desirable that the lower feed apron should be as close to the snapping rolls 27 and 28 as possible, so that little trash will pass downwardly on to the husking rolls. The distance however, between the rear end of the feed apron and the snapping rolls should be long enough to permit the ears of corn broken off by the snapping rolls to drop down properly on to the husking rolls. By operating the shaft 68 to turn the screw shafts 72, the lower feed apron may be moved longitudinally to and from the snapping rolls in accordance with the different sizes of the corn to be husked, and so as to leave as little space as possible between the feed apron and the snapping rolls. The screw adjusting mechanism provided is self locking and will securely hold the feed apron in its adjusted position.

The forward sprocket wheel shaft 63 is preferably journaled in boxes 75 that are arranged within longitudinally slotted brackets 76 on the forward end of the side pieces 59. Adjusting bolts 77 pivoted to the boxes 75 extend through the ends of the brackets so that the position of the forward shaft 63 may be adjusted to take up the slack in the endless feed apron. In operation, the upper portion of the feed apron rests upon the supporting strips 61 and is rigidly held thereby in substantially horizontal position.

The lower feed apron is driven from the cross shaft 42 which has a sprocket 79 (see Fig. 2) on its right hand end. A drive chain 80 passes over the sprocket wheel 79 and over a large sprocket wheel 81 on a cross shaft 82 journaled in the front part of the machine frame. At its inner end the chain 80 also passes over a guiding or tightening sprocket wheel 83 carried upon an inclined adjustable support 84, so that the upper portion of the chain is held in substantially horizontal position beneath one of the side bars 59 of the lower feed frame. The lower feeder or apron is driven from the chain 80 through the medium of a sprocket wheel 85 fixed to the rear shaft 63 of the feeder and engaging the upper portion of the chain. Sprocket 85 will properly engage the upper horizontal portion of the chain 80 and be driven thereby, in all of the adjusted positions of the lower feed apron.

The upper feed rake 54 is arranged over the central and rear portion of the lower feed rake and is mounted upon a swinging frame comprising the side bars 86 pivoted at their forward ends to a cross shaft 87 and held apart by a cross-strut 88. Shaft 87 is journaled in suitable boxes fixed to bent brace bars 89 which are bolted to and rise from the upper side bars 56. A shaft 90 extending between the rear free ends of the side bars 86, carries small sprocket wheels 91 and the shaft 87 carries sprocket wheels 92 which are preferably about twice the size of the sprocket wheels 91. Chains 93 passing over the sprocket wheels 91 and 92, carry the cross slats 93 and 94. Cross slats 93 and 94 are of different thicknesses and are alternately arranged so that a rough feeding surface is provided which is well adapted to catch the stalks, especially any stalks that are projecting upwardly as they enter the feeder. By providing large and small wheels for the upper feed rake, the lower or feeding portion thereof is arranged substantially parallel to the lower feed rake or apron so that a long gripping surface is provided for gripping the stalks which are therefore firmly held and properly delivered to the snapping rolls. The long gripping surface of the upper rake prevents the stalks from tipping or bending as they are apt to do if gripped between the upper and lower feed rakes at one point only. In this way all the stalks are properly delivered to the snapping rolls. If any of the inner ends of the stalks are tripped or bent out of line of the snapping rolls, they will miss the rolls and pass down on to the husking rolls. The present arrangement prevents any such imperfect operation of the feeders.

The forward shaft 87 of the upper feed rake is provided on one end (see Fig. 3) with a sprocket 96 over which passes a drive chain 97. The lower forward end of the chain passes over a sprocket wheel 98 on the end of the cross shaft 82. Shaft 82 is driven as previously described, by the drive chain 80 (see Fig. 2) passing over the sprocket wheel 81 on its opposite end. Chain 97 (see Fig. 3) also passes over a tightening sprocket wheel 99 (see Fig. 3) that engages the under side of the chain adjacent the wheel 96. Sprocket 99 is mounted upon an adjustable support 100.

As stated, the ears broken off by the snapping rolls 27 and 28, slide down the deflecting plate 31 on to the husking rolls 36 and 37. The lower edge of the deflecting plate 31 (see Fig. 4) extends across the machine just above the rear ends of the husking rolls. The husking bed comprises a number of sets or pairs of rolls (in the form shown five sets or pairs are employed) and the rolls of each pair are driven toward each other so that the husks are gripped between them, are stripped from the ears of corn and carried between the rolls through the husking bed. Each pair or set of rolls comprises a roll 36 that is held against lateral movement and roll 37 that is spring-held into engagement with the fixed roll 36 so that it may securely grip the husks and at the same time yield to some extent to permit the passage of the husks between the rolls. The shafts 102 of the fixed rolls 36 are journaled in bearing boxes 103 that are fixed to the cross angle bars 39 and 40 (see Figs. 4 and 8).

Shafts 104 of the yielding rolls 37 of each pair are journaled in boxes 105 that are slidably mounted upon the cross angle bars 39 and 40. The fixed and yielding rolls of the several sets or pairs are alternately arranged, as indicated in Fig. 8, and each roll 37 is spring-held toward the fixed roll 36 of the same pair by coiled cushioned springs 106 extending between the journal bearings 105 of the yielding roll and the journal bearings 103 of the fixed roll of the next adjacent pair. The springs 106 for the yielding roll 37 on the end of the series, are held in place by fixed cup-shaped pieces 107. Each yielding roll 37 is prevented from being forced too tightly against the corresponding fixed roll 36 by stop screws 108 that are threaded into the sliding bearings 105 and abut against the fixed bearings 103. The shafts of the rolls are provided on their inner ends with a set of inter-meshing spur pinions 109 mounted on the fixed shafts 102 and on the shafts 104 of the yielding rolls. By this arrangement the fixed roll of each pair is not only geared to its coöperating yielding roll but is also geared to the adjacent yielding roll of the next set or pair, and all the rolls therefor rotate in timed relation. Every other fixed roll (in the present form the first, third and fifth fixed rolls) is provided with a large beveled pinion 111 that is fixed to the inner end of the shaft 102 and preferably formed in piece with the pinion 109 thereon. That is to say, the teeth of the pinion 109 are cut on the hub of the large beveled gear 111.

The cross drive shaft 42 for the husking rolls is journaled in bearings 112 on the pieces 41 that extend between the cross bars 40 and 25′, and is provided with beveled pinions 113 meshing with the beveled gear 111. The positively driven fixed rolls drive the other intermediate fixed rolls through the medium of the pinions or gears 109 upon the yielding rolls 37. By this arrangement the number of beveled gears necessary is cut down and large powerful beveled drive gears may be employed within the space occupied by the husking bed.

The husking rolls 36 and 37 are preferably hollow and formed of cast iron with end portions or heads 114 and intermediate partitions 115. Preferably also, the rolls are formed by casting them directly upon their supporting shafts 102 and 104. The shaft is provided with sockets 116 into which the metal of the cross partition 115 runs in the casting operation. Preferably also, the shafts are provided with longitudinally extending key-ways 117 into which the metal of the body of the roll runs during the casting operation, so that the body of the rolls and the shafts are firmly united.

Each husking roll is provided with two or more rows or grip pins 118 and with holes 119 arranged in line with the pins. The pins project slightly beyond the periphery of the rolls and serve to catch the husks and start them through the rolls. The holes are considerably larger than the pins and so disposed that the pins on one roll of each pair will enter the holes of the other roll. This is not only the case with the rolls of each pair or set, but the pins and holes on the adjacent rolls of different sets are so arranged and the rolls are so driven in proper time that the pins will enter the holes in passing. By this arrangement, the separate sets of rolls may be set closely together. In some prior devices, annular grooves are employed to permit the passage of the pins on adjacent rolls, but these grooves materially decrease the gripping surface of the rolls while only a small amount of such gripping surface is lost by the use of the holes in the applicant's construction.

The pins 118 are preferably formed of sheet steel and have hook-shaped ends that face toward the direction of rotation, as shown in Fig. 11. These pins are set within brass studs 120 (see Fig. 12) that set within openings 121 in the rolls. The brass supporting studs are not screwed into the rolls but are forced into position in the holes 121 so that the pins are held in place by friction. Holes 119 and 121 extend through the shell of the hollow rolls, so that, if one of the pins is broken or worn out it may be readily driven through into the hollow roll, since the brass supporting plug 120 is somewhat soft and yielding, and the pin and supporting stud will then drop out through one of the larger openings 119 and a new pin may be readily inserted in its place.

Guard or guiding bars 122 (see Figs. 4, 5, 8 and 10) are secured at their ends to the fixed bearings 103 of the husking rolls 36 and extend above the spaces between the adjacent rolls of the different sets or pairs. These bars prevent the ears of corn from sliding down over the husking bed between the adjacent rolls of different sets, in which position they would not be husked. The bars are preferably square or rectangular in section and set on edge or in angular position, as indicated in Fig. 10, so as to deflect the ears in opposite directions on to the adjacent rolls, where they will be carried over into the spaces between the two coöperating rolls of the several sets or pairs. The shape and arrangement of these bars 122 also prevents the husks carried around the rolls 36 from clogging beneath the bars.

Suitable devices are provided for aiding the feed of the ears downwardly over the inclined husking bed. The feeding devices or "assisters" as they are called, comprise a series of endless feed belts or chains 123 that are arranged over and mid-way between the coöperating rolls of each pair or set and between the guiding or guard bars 122, as indicated in Fig. 5. The several feed chains or assisters are carried on independent frames. These frames comprise (see Figs. 13 and 15) two guiding channel bars 124, connected together at their forward ends by a U-shaped bracket 125 that is swiveled upon a cross shaft 126. The side guiding bars 124 are also connected intermediate their ends by a cross piece 127 having a looped portion 128 rising therefrom, and a hook 129 formed upon the upper end of the loop 128 is arranged to engage a cross support 130 so that the assister frame cannot drop below its normal position, but it is free to rise slightly if the ears of corn are bunched beneath it. A stop 129' on the hook limits this upward movement. Each assister chain 123 passes over a sprocket 131 that is fixed to the shaft 126 between the arms of the U-shaped bracket 125. Each chain passes over a sprocket 132 on a hollow stud 133 formed on suitable brackets 134, that are fixed to the inner ends of the side bars 124. The chains are provided at intervals with outwardly projecting spurs 135 and with laterally projecting cross pieces 136. The flanges of the guide bars 124 face inwardly, as shown in Fig. 14, so that the cross pieces 136 on the lower operating pair of the assister or feeding device, are in engagement therewith.

As stated, the assister aids in feeding the ears of corn down over the husking rolls and prevents the ears from being clogged or bunched together. The guide bars 124 support the assister chains and prevent the spurs 135 thereon from passing too far down between the rolls, so that they cannot be caught in the pins or holes thereof. At the same time, since the flanges of the guide bars 124 are spaced some distance apart, the spurs are free to rise and adjust themselves to the different sizes of the ears of corn, and shelling of the corn is thus avoided. It will be seen that an independent assister chain is provided for each pair of husking rolls, and that each chain is carried on a separate frame that may swing upwardly about the shaft 126 at its lower end so that its upper end will yield to receive an accumulation of a bunch of ears at this point, without shelling the ears.

The assisters are driven by a spur gear 137 (see Fig. 2) on the end of the shaft 126 that meshes with a spur gear 138 on the cross shaft 82.

It will be observed that a very simple drive mechanism for the snapping and husking rolls and for the two feeders and the assisting devices, is provided. The lower snapping roll is geared directly to the cylinder shaft and the husking roll drive shaft 42 is geared to the lower snapping roll on the left hand side of the machine (see Fig. 3). The upper snapping roll is driven from the cross shaft 42 through the idler 52 on the opposite side of the machine (see Fig. 2). Shaft 42 also operates chain 80 from which the drive shafts 63 and 82 for the upper and lower feed rakes or aprons and the shaft 126 for operating the assisters of the husking rolls is also driven from shaft 82 by the gears 137 and 138.

The stalks passing through the snapping rolls 27 and 20, are finely shredded by the knives 24 on the cylinder 20, so as to be suitable for fodder. These knives are provided with sharpened side and end edges and are set in planes at right angles to the axis of revolution. As shown in Fig. 4ª, the knives are staggered so that they rotate in different planes which are, however, so closely together as to cover practically the entire width of the snapping rolls. By this arrangement, the stalks are effectively shredded and the necessity of employing knives upon the concave plate 25 is avoided and the shredding cylinder runs very easily. Moreover, the weight of the knives and metal bars 23 whereon they are mounted, assist the steady, easy running of the cylinder.

While it is desirable to arrange the mechanism so that it will shell as little corn as possible, this cannot be entirely avoided and the corn that is shelled must be separated from the fodder. For this purpose the shredded fodder passes from the cylinder 20 over the grate 26 and onto a fodder rack 139 that is similar in construction to the separating straw floor or rack of a thrashing machine. Rack 139 is pivotally mounted at its ends upon the rock arms 140. These rock arms are mounted intermediate their ends on cross supporting rods or shafts 141 and a grain conveyer 142 is pivotally mounted on the lower ends of the rock arms. The forward rock arms 140 depend below the grain conveyer 142 and are connected by pitmans 143 to an operating cranked shaft 144. Shaft 144 is provided on its ends with a large pulley 145 (see Fig. 3), and a drive belt 146 passes over this pulley and over a small pulley 147 on the end of the cylinder shaft 19. By this mechanism, the fodder rack 139 and grain conveyer 142 are given a rates from the fodder on the rack 139. The grain passing through the grate 36 and rack 139 fall on to the conveyer 142 and pass on to the cleaning sieves 148 fixed to the end of the grain conveyer. The grain is here subjected to the blast of the fan 149 and the chaff is separated therefrom. The corn passes through the sieves on to an inclined deflecting plate 150 and down into the casing 151 of the grain auger or cross conveyer 152. The fodder and chaff from the end of the machine passes into the fan 153 of a pneumatic stacker, or on to any other suitable form of stacking device. The fan 149 is mounted on a cross shaft 154 that is driven by a belt 154' from a small pulley 144' (see Fig. 3) on the cranked shaft 144.

The fan casing 155 is cylindrical, has a tangentially extending mouth portion 156 and its end walls are provided with large air inlet openings or eyes 157. The wings 158 (see Figs. 16 and 17) of the fan are formed of narrow cross boards arranged adjacent the periphery thereof and bolted to straps that are of wrought iron or steel and bent to V-shape, as shown. There are two of these straps for each wing 158 at opposite ends of the fan casing. Each of these V-shaped straps comprises an approximately radial supporting bar and an inclined brace bar 160. The supporting bars 159 extend in substantially radial direction and are connected together at their inner ends to form rectangular portions about the hubs 162 that are fixed to the end of the fan shaft 154. There are four wings in the form shown and the portion of the hub 162 with which the bars 159 engage is square in section, and the oppositely disposed bars 159 are arranged on opposite sides, as shown, of this squared portion of the hub. The inner end of each supporting bar 159 is bent outwardly and connected by a bolt 163 to the next adjacent bar 159. The legs 160 form inclined brace bars for the wings and their inner bent ends are connected by bolts 164 to the next adjacent bar 159. The number of wings of course may be increased or diminished as desired. The construction of the fan is light and inexpensive, but very strong and rigid. Moreover, it presents little obstruction to the passage of the air inwardly through the eyes of the fan to the central portion thereof.

The husks shredded from the corn by the rolls 36 and 37 pass therethrough on to a conveyer 165 arranged below the same. The forward end of the conveyer extends beyond the forward lower ends of the husking rolls and from this point, extends upwardly and rearwardly to the forward edge of the grain conveyer 142 to which it is connected. The forward end of the inclined husk conveyer 165 is pivoted to rock arms 166 on a cross supporting rod or shaft 167. The conveyer 165 is provided with upwardly and rearwardly facing teeth 168 and partakes of the to and fro motion of the grain conveyer 142 so that the husks are carried rearwardly over the conveyers 165 and 142 to the cleaning sieves and fan. In this way everything passing through the husking rolls, even from the very lowest point thereof, is carried back to the cleaning sieves and fan and all grain shelled by the operation of the husking rolls is separated from the husks and other trash.

From the husking rolls the ears pass down through the contracted or funnel shaped chute 169, into the trough 170 of the ear elevator (see Figs. 1, 4 and 5). This trough is supported at its lower end upon heavy brackets or castings 171 fixed to the front bolster 15. Near its central portion the conveyer trough is connected to a cross piece extending between the ends of forwardly extending side bars 172 of the machine frame. An endless conveyer belt 173, having cross slats 174 thereon, passes through the trough 170 and over pulleys 175 carried on shafts 176 journaled in castings 171 and at the outer end of the trough. A delivery spout 177 is preferably pivoted to the upper end of the conveyer and is held in place by a brace bar 178. Preferably also, the upper end of the conveyer trough is hinged as at 179, so that it may be swung back, when not in use, on top of the machine.

The ear elevator and the shafts 176 thereof at its lower end, are necessarily considerably narrower, as shown in Fig. 5, than the body of the machine in order to leave clearance for the swing of the wheels on the steering axle 16. For this reason, it is impossible to directly drive the shaft 176 from the ends of any of the cross shafts of the machine. The direct drive of the shaft is however, made possible by employing a split sprocket wheel 180 (see Figs. 1 and 4) that is fixed to the crank shaft 144 in line with a sprocket wheel 181 on the end of the short shaft 176 at the lower end of the elevator (see Fig. 5). A drive chain 182 passes over the two-pieced sprocket 180 and sprocket 181, and also preferably over a guiding or tightening sprocket 183 arranged adjacent the sprocket wheel 181 and journaled on a support 184, that depends from one of the brackets 171.

It is obvious that numerous changes may be made in the details of construction without departure from the essentials of the invention.

Having described my invention, what I claim as new, and desire to secure by Letters Patent, is:—

1. In husking machines, the combination with shredding cylinder, a shaft therefor, and snapping rolls in front of said cylinder, one of said snapping rolls being spring-held in position and vertically movable and the other roll fixed, of a cross-shaft held against lateral movement, gears on one side of the machine connecting said cylinder shaft to the fixed roll and to said cross shaft, a large intermediate gear loosely mounted on the opposite end of said cylinder shaft and gears on said yielding roll and cross-shaft meshing with said intermediate gear, substantially as described.

2. In husking machines, the combination with a shredding cylinder, cylinder shaft, snapping rolls and husking rolls, of a transverse shaft geared to said husking rolls, gears on one side of the machine connecting said cylinder shaft with one of said snapping rolls and with said transverse shaft, and gears on the opposite side of the machine connecting the other of said snapping rolls to said transverse shaft, substantially as described.

3. In husking machines, the combination with the shredding cylinder, snapping rolls, one of which is spring-held in position and vertically movable, and with the husking rolls, of a power shaft whereon said shredding cylinder is mounted, a transverse shaft geared to said husking rolls, gears on one side of the machine connecting said power or cylinder shaft to said fixed roll and to said transverse shaft, a large intermediate gear loosely mounted on the opposite end of said cylinder shaft and gears on said yielding roll and said transverse shaft meshing with said intermediate gear, substantially as described.

4. In husking machines, a husking bed comprising a number of sets of rolls, all of said rolls being arranged in the same plane and one roll of each set being held against lateral movement and the other spring held in position and movable laterally in the plane of the husking bed to and from the fixed roll, said fixed and yielding rolls being alternately arranged across the husking bed, a train of intermeshing gears, one on each of said rolls, a drive shaft and gears connecting said drive shaft with a number of said fixed rolls, substantially as described.

5. In a husking machine, the combination with a husking bed comprising a series of husking rolls arranged in pairs, a pair of supporting cross-bars, fixed and sliding bearings alternately mounted on said cross-bars, adjustable stop screws between the sliding and the fixed bearings of each pair of rolls, springs between the sliding bearings of each pair of rolls and the fixed bearings of the next adjacent pair, a train of intermeshing gears connecting said rolls, and means for directly driving a number of said fixed rolls, substantially as described.

6. In husking machines, the combination, with the snapping rolls and the pairs of inclined husking rolls leading therefrom, of a cross-shaft above the lower ends of said husking rolls, a series of independent swinging frames pivoted at their lower ends on said shaft, one of said frames being arranged above each pair of husking rolls, wheels fixed to said shaft, wheels journaled at the upper ends of said frames, endless feeders passing over said wheels, a transverse rod above said frames, hooks for yieldingly supporting said frames in position above said husking rolls, said hooks having stops immediately below said rod for limiting the upward movement of said frames, substantially as described.

7. In husking machines, the combination with the snapping rolls and with the pairs of inclined husking rolls leading therefrom, of a drive shaft arranged above the lower ends of said husking rolls, a series of swinging frames, one for each pair of husking rolls, comprising channeled side bars pivoted at their lower ends upon said shaft, wheels fixed to said shaft between the side bars of each of said frames, wheels journaled between the upper ends of each pair of side bars, a series of endless feed chains having projecting spurs passing over said wheels, hooks fixed to said side bars, and a cross support with which said hooks loosely engage to yieldingly hold said frames in position, substantially as described.

8. In husking machines, the combination with the snapping rolls and with the pairs of inclined husking rolls leading therefrom, of a drive shaft arranged above the lower ends of said husking rolls, a series of swinging frames, one for each pair of husking rolls, comprising channeled side bars pivoted at their lower ends upon said shaft, wheels fixed to said shaft between the side bars of each of said frames, wheels journaled between the upper ends of each pair of side bars, a series of endless feed chains having projecting spurs passing over said wheels, the flanges of each set of side bars being turned inwardly, cross supports on said chains, loosely engaging the flanges of said side bars, and means for yieldingly supporting said frames in position, substantially as described.

9. In husking machines, the combination with the snapping and husking rolls, of upper and lower endless feed rakes or aprons for delivering the stalks to said snapping rolls, endless assisting feeders cooperating with said husking rolls, said feed rakes and said assisting feeders having drive shafts at one end, a shaft journaled on the machine frame, chains connecting said shaft with the drive shafts of the aprons or feed rakes, intermeshing gears on said shaft and upon the drive shaft of said assisting feeders, and means for driving said connected shafts, substantially as described.

10. In husking machines, the combination with the snapping rolls and with the husking rolls leading therefrom, of upper and lower endless feed rakes or aprons for delivering the stalks to said snapping rolls, endless feed chains coöperating with said husking rolls, each of said endless feed devices having a drive shaft at one end, a cross drive shaft geared to said husking rolls, a power shaft, gears connecting said power shaft with said snapping rolls and with the drive shafts for said husking rolls, a cross-shaft journaled in the machine frame, a drive chain on one side of the machine connecting said cross-shaft with the drive shaft for the husking rolls, a sprocket on the drive-shaft of the lower feed rake engaging said chain, a chain on the opposite side of the machine connecting said crossshaft with the drive-shaft of said upper feed rake, and intermeshing gears on said cross shaft and the drive shaft for said assistant feeders, substantially as described.

11. In husking machines, the combination with the snapping rolls and with the forwardly and downwardly inclined husking rolls leading therefrom, a lower endless feed rake or apron bodily adjustable to and from said snapping rolls, a drive shaft therefor at its rear end, a swinging upper, endless, feed rake or apron, a drive shaft whereon the same is pivoted at its forward end, a series of assisting endless feed chains arranged above said husking rolls, swinging frames whereon said chains are mounted, a drive shaft whereon said frames are pivoted at their forward ends, a cross shaft journaled in the front of the machine frame, a second cross shaft journaled in the machine frame adjacent to said snapping rolls, means for driving said second cross-shaft, a drive chain connecting said cross shafts, a sprocket wheel on the drive shaft of the lower feed apron engaging said drive chain, a chain connecting said first mentioned crossshaft with the drive shaft of the upper feed apron, and gears connecting said cross-shaft with the drive-shaft of the assisting feed chains, substantially as described.

12. In husking machines, the combination with the snapping rolls and with the husking rolls leading therefrom, one of said snapping rolls being yieldingly spring-held in position, of a transverse shaft, gears on one side of the machine connecting said shaft to the fixed snapping roll, gears on the opposite side of the machine connecting said shaft to the yielding roll and intermeshing gears on said cross shaft and said husking rolls, substantially as described.

13. In husking machines, the combination with the snapping rolls and with forwardly and downwardly inclined husking rolls leading therefrom, one of said snapping rolls being yieldingly spring-held in position, of a power shaft, a cross shaft, spur-gears on one side of the machine connecting said power shaft with said fixed snapping roll and with said cross shaft, spur-gears on the opposite side of the machine connecting said cross shaft and said yielding snapping roll and intermeshing beveled gears on said cross shaft and on said husking rolls, substantially as described.

14. In husking machines, the combination with the snapping rolls, of a husking bed which comprises a series of inclined, longitudinally extending rolls arranged in pairs, a pair of supporting cross-bars, fixed and sliding bearings for said rolls alternately arranged on said cross-bars, said sliding bearings being yieldingly spring-held in position, a cross-shaft above the lower ends of said rolls, a series of independent frames pivoted on said shaft, one arranged above each pair of husking rolls, a series of feed chains carried by said frames and driven from said shaft, means for yieldingly supporting said frames above said rolls, a series of fixed, deflecting bars arranged between said feed-chains and between the pair of husking rolls, said deflecting bars being fixed at their ends to said supporting crossbars, and mechanism for driving said snapping and husking rolls and said shaft, substantially as described.

WALLACE F. MacGREGOR.

Witnesses:
 ELLIS J. GITTINS,
 FREDERICK LEE NORTON.

Copies of this patent may be obtained for five cents each, by addressing the "Commissioner of Patents, Washington, D. C."